United States Patent
Guignard et al.

(10) Patent No.: US 11,954,943 B2
(45) Date of Patent: Apr. 9, 2024

(54) METHOD FOR GENERATING SYNTHETIC DATA

(71) Applicant: QUALCOMM INCORPORATED, San Diego, CA (US)

(72) Inventors: Jean-Baptiste Guignard, Bordeaux (FR); Thomas Amilien, Los Angeles, CA (US); Laurent Gaidon, Peujard (FR); Ophir Paz, Floirac (FR)

(73) Assignee: QUALCOMM Incorporated, San Diego, CA (US)

(*) Notice: Subject to any disclaimer, the term of this patent is extended or adjusted under 35 U.S.C. 154(b) by 643 days.

(21) Appl. No.: 17/129,379

(22) Filed: Dec. 21, 2020

(65) Prior Publication Data

US 2022/0198179 A1 Jun. 23, 2022

(51) Int. Cl.
G06T 17/20 (2006.01)
G06T 19/20 (2011.01)
G06V 20/64 (2022.01)
G06V 40/20 (2022.01)

(52) U.S. Cl.
CPC .............. G06V 40/28 (2022.01); G06T 17/20 (2013.01); G06T 19/20 (2013.01); G06V 20/647 (2022.01)

(58) Field of Classification Search
CPC ...... G06V 40/28; G06V 20/647; G06V 20/20; G06V 40/107; G06T 17/20; G06T 19/20; G06T 19/00; G06T 2207/00; G06T 7/00; G06T 11/00; G06N 3/00
See application file for complete search history.

(56) References Cited

U.S. PATENT DOCUMENTS 10,803,616 B1 * 10/2020 Twigg .................. G06F 3/012
11,334,762 B1 * 5/2022 Wrenninge ............ G06V 20/56
(Continued)

FOREIGN PATENT DOCUMENTS

CN 110148146 A 8/2019
CN 112070074 A * 12/2020
(Continued)

OTHER PUBLICATIONS

Man, Keith, and Javaan Chahl. "A Review of Synthetic Image Data and Its Use in Computer Vision." Journal of Imaging 8.11 (2022): 310. (Year: 2022).*

(Continued)

*Primary Examiner* — Emily C Terrell
*Assistant Examiner* — Stefano Anthony Dardano
(74) *Attorney, Agent, or Firm* — QUALCOMM Incorporated (57) ABSTRACT

The embodiments are directed to generating synthetic data. For example, in some examples, a method for creating 2D images of an object with annotation points is carried out by a processing unit. The method includes considering a synthetic 3D model of the object, named synthetic object, with annotation points correctly placed on the synthetic object. The method also includes generating several synthetic objects with different poses and different brightness conditions. Further, the method includes considering several 2D images with different backgrounds and different brightness conditions. For each 2D image, the method includes insertion of a generated synthetic object in the 2D image.

20 Claims, 4 Drawing Sheets

(56) References Cited

U.S. PATENT DOCUMENTS

| | | | | |
|---|---|---|---|---|
| 2007/0165027 A1* | 7/2007 | Nakadaira | ............. | G02B 30/52 |
| | | | | 348/E13.059 |
| 2020/0090409 A1 | 3/2020 | Fink et al. | | |
| 2020/0151884 A1 | 5/2020 | Vajapey et al. | | |
| 2020/0234083 A1 | 7/2020 | Farivar et al. | | |

FOREIGN PATENT DOCUMENTS

| | | | | |
|---|---|---|---|---|
| GB | 2501929 A | * | 11/2013 | ............. A63F 13/00 |
| JP | 2020102041 A | | 7/2020 | |
| WO | 2017031385 A1 | | 2/2017 | |
| WO | 2020210112 A1 | | 10/2020 | |

OTHER PUBLICATIONS

Lepetit, Vincent. "Recent advances in 3d object and hand pose estimation." arXiv preprint arXiv:2006.05927 (2020). (Year: 2020).*

Abu Alhaija, Hassan, et al. "Augmented reality meets computer vision: Efficient data generation for urban driving scenes." International Journal of Computer Vision 126 (2018): 961-972. (Year: 2018).*

Yang, Dongseok, et al. "Synthetic hands generator for RGB hand tracking." TENCON 2018-2018 IEEE Region 10 Conference. IEEE, 2018. (Year: 2018).*

\* cited by examiner

METHOD FOR GENERATING SYNTHETIC DATA

BACKGROUND

The present invention relates to a method for generating synthetic data. The present invention particularly applies to annotation points on 2D images of a hand. Annotation points are key points placed on strategic area of the hand. However, the present invention can be applied to others application area where an object has to be detected in an image.

The key points define the object structure and allow any such object to be recognized for example after a Machine Learning model has been trained to identify that object. E.g. a hand has a 21-25 key point skeleton structure.

In computer vision, hand tracking involves extracting the pose of the hand for each image included in a video, or in a sequence of images. A hand pose can generally be expressed as a collection of the locations of the joints of the fingers and the palm. Hand tracking is gaining momentum in academia and industry due to its broad applications, such as human-machine interaction, robotic design, avatar animation, gesture comprehension and augmented reality. Although a lot of effort has been put into this area, hand tracking remains very difficult due to these issues:

large dimensional configuration space of the hand pose;
homogeneous distribution of the colors of the skin of the hand;
frequent self-occlusion and occlusion by other objects;
quick hand movement.

In order to improve the hand tracking system, it is imperative to effectively detect a hand. Given the diversity of hands, machine learning technology seems to be a good candidate for effective hand identification. However, designing a machine learning engine requires a lot of training data.

The performance of Machine Learning (ML), whether it is considered supervised or unsupervised, depends primarily on the learning training dataset used. This training dataset is supposed to be made up of a large population of annotated samples representing the various possible contexts of use and the expected results in these situations. For generalization to be possible, that is, for predictions to be correct on data not present in the training samples, the training dataset must be fairly substantial.

In the context of gesture recognition, for example, learning samples are mostly 2D images in which a hand adopts a particular pose. Depending on the pose, a gesture is recognized and an action is triggered by software. This software is particularly in demand in the context of AR/VR (Augmented Reality/Virtual Reality) headsets. The problem added by this material is that the rendering expected by the users is in 3D whereas the shooting cameras are generally 2D cameras. Indeed, the AR/VR equipment has a display screen for the user in 3D. It is therefore imperative to deduce the position of the hand in 3D space from 2D cameras which are most often monochrome. Training datasets of ten thousand samples minimum are available on the internet. In theory, the samples should be varied: hands of different ethnicities and sizes, different environments and changing light conditions. If these variations are not respected, the result of the learning called "model" may be over-trained.

The creation of substantial training datasets is necessary for each new 2D camera used in the AR/VR equipment and each new point of view (front or back camera of the smartphone, above the console of a car, in an AR/VR, etc.). This creation of samples is usually manual and can be particularly time consuming. Manual annotation of, say, twenty-two points for a 3D image can take up to four minutes with a simple 3D engine. It involves placing for example twenty-two points on predefined joints and areas of the hand. Another disadvantage of the manual method is that without physical constraints or length benchmarks, the Z (depth) is annotated differently depending on the annotator. For the same hand, the fingers can vary from five to twenty centimeters apart depending on the annotator. In cases where part of the hand is hidden, the position of the fingers can be difficult to deduce.

Document US20200151884A1 discloses an automated annotated object tracking tool that allows machine-learning teams to annotate an object within a frame and have that annotation persist across frames as the annotated object is tracked within a series of frames.

Document WO2017031385A1 discloses a user device within a communication architecture, the user device comprising an asynchronous session viewer configured to receive asynchronous session data, the asynchronous session data comprising at least one image, camera pose data associated with the at least one image, and surface reconstruction data associated with the camera pose data; select a field of view position; and edit the asynchronous session data by adding/amending/deleting at least one annotation object based on the selected field of view.

Document US20200090409A1 discloses a method comprising the steps of capturing a first image at a location and location data associated with the first image; placing an augmented reality (AR) object within the first image with reference to the location data associated with the first image; storing the AR object and location data associated with the first image; and placing the AR object into a second image when location data associated with the second image corresponds to the location data associated with the first image.

Document CN110148146 (A) discloses a plant leaf segmentation method using synthetic data.

Document JP2020102041 (A) discloses a learning data generation system capable of generating a large number of learning data used for learning machine learning model in Deep Learning. Composite images are generated from part images.

Document WO2020210112 discloses a method for creating synthetic images with photo-realistic images.

Document US2020234083 (A1) discloses a training platform receiving data for generating synthetic models of a body part, such as a hand. The data may include information relating to a plurality of potential poses of the hand. The training platform may generate a set of synthetic models of the hand based on the information, where each synthetic model, in the set of synthetic models, representing a respective pose of the plurality of potential poses. The training platform may derive an additional set of synthetic models based on the set of synthetic models by performing one or more processing operations with respect to at least one synthetic model in the set of synthetic models, and causing the set of synthetic models and the additional set of synthetic models to be provided to a deep learning network to train the deep learning network to perform image segmentation, object recognition, or motion recognition.

The object of the present invention is to propose a dynamic solution in the recognition of gestures and hand tracking. Another goal of the invention is a new fast and efficient method for creating training data for a machine learning engine. Another object of the invention is a new method for creating rich data to improve learning when machine learning is used.

SUMMARY

At least one of the above-mentioned objects is achieved with a method for creating 2D images of an object with annotation points, the method being carried out by a processing unit and comprising the steps of:
considering a synthetic 3D model of the object, named synthetic object, with annotation points correctly placed on the synthetic object,
generating several synthetic objects with different poses and different brightness conditions,
considering several 2D images with different backgrounds and different brightness conditions,
for each 2D image, insertion of a generated synthetic object in the 2D image.

The present invention uses the benefits of a perfect key point location in 3D and perfect resolution of 3D synthetic objects to build 2D images. An advantage of the present invention is a high precision in the placement of annotation points on the object as the points are predefined. As the method according to the invention uses 3D synthetic objects, the texture rendering and the resolution are good, which greatly improves training when machine learning is used. The combination of the 3D synthetic object with the 2D image is recorded as a 2D image. Computer steps of the present invention can be carried out by a processing unit. Advantageously, 2D images can constitute training dataset that can be used for training anomaly detection model in a machine learning system.

The method according to the invention allows the creation of 2D images comprising annotated object with great precision. As a matter of fact, the synthetic object is a perfect object with annotation points clearly and accurately placed in good places. Thus, the 2D images can be used as training dataset for a machine learning. Several thousand of 2D images can be created in few minutes. The method of the invention is faster than the manual method according to the prior art. Creating thousands of poses of synthetic objects allows for a large amount of images available under various circumstances.

According to an embodiment of the invention, the step of insertion can consist in randomly inserting generated synthetic objects in 2D images. In this case, all or part of the synthetic objects are respectively placed on all or part of 2D images. The generated synthetic objects can, respectively or not, randomly be inserted in 2D images. A generated synthetic object can be inserted in only one 2D image but other configurations are possible such as a generated synthetic object inserted in several 2D images or a same 2D image used to insert different generated synthetic objects to create several 2D images with annotated objects.

Preferably, the step of insertion can consist, for each 2D image, in inserting a generated synthetic object in the 2D image only when the generated synthetic object and the 2D image present the same brightness conditions. In this case, a detection of the background of each 2D image is carried out and a classification is made. The combination between one synthetic object and one 2D image is performed by comparison of the intensity of the background brightness and that of the lighting of the object. The comparison between intensities is realized with a margin of error.

Advantageously, the brightness conditions comprise the intensity of the background of the 2D image. For example, this intensity can be measured by determining an average intensity in a part of the image or in the whole image. For example, two different methods of insertion can be applied. A first method of insertion: 2D images are taken from video acquired using a 2D camera. The environment in which the camera operates to acquire the 2D images is also modeled with the actual brightness conditions. Thus for each 2D image, the precise brightness conditions are known in the 3D engine. We can thus associate a synthetic object, such as a hand, with each 2D image having the same brightness conditions.

In the second method of insertion, the environment in which the 2D camera operates is not modeled. On predetermined 2D images, an average brightness is calculated for each image. Each 2D image is associated with a brightness score. Then a 2D image is associated with a hand having the similar average intensity. Then, following steps are performed to properly place the object, like a hand, in the 2D image: 1: defining a frame around the hand. 2: locally calculating a brightness on the 2D image, i.e. by considering areas of the size of the predefined frame so as to find a frame which has the same brightness as the hand 3: integration of the hand in the 2D image at the location of the area with the same brightness as the hand.

According to an advantageously embodiment of the invention, the 2D images come from a same 2D camera. Preferably, the 2D images are real images. The invention can take place in an augmented reality or virtual reality application where a 2D camera is used to detect for example hand gestures. In such an application, the gestures have to be identified to trigger an action. The gesture is thus considered as an input. To perfect the recognition of gestures, it is provided to build a machine learning model. To do so, the 2D camera of the invention is used to capture a plurality a 2D images in different background. The images are then used to create the 2D images with annotated object. These images comprising different configurations of the object that can then be used as training dataset to feed a machine learning.

Advantageously, the 2D camera is a monochrome or an infrared camera. The invention is thus remarkable because it makes it possible to obtain a high precision on placement of annotated points on an object based on numerous images of low quality.

According to the invention, the step of generating several synthetic objects can comprise generating synthetic objects with different physical parameters. For example, physical parameters may comprise the size, the color and/or accessories arranged on the object. The goal is to have several objects representative of different parameters. The accessories can be watches, tattoos, rings, bracelets . . . etc.

Advantageously, the object according to the invention can be a hand. It can also be any 3D object such as electronic cigarette, drill, photo frame, glasses, helmet, screwdriver, etc. For example, during the generation of synthetic hands, ten hands can be predefined to combine all possible combinations. Thousands poses of hands can be generated. The poses are idealized poses that allow to have 22 points in XYZ, out of which we infer gestures.

According to another aspect of the invention, it is proposed a computer program product, comprising:
a computer-readable storage device; and
a computer-readable program code stored in the computer-readable storage device, the computer-readable program code containing instructions that are executed by a central processing unit (CPU) of a computer system to implement a method for creating 2D images of an object with annotation points, the method comprising the steps of:

considering a synthetic 3D model of the object, named synthetic object, with annotation points correctly placed on the synthetic object, generating several synthetic objects with different poses and different brightness conditions, considering several 2D images with different backgrounds and different brightness conditions, for each 2D image, insertion of a generated synthetic object in the 2D image.

BRIEF DESCRIPTION OF THE DRAWINGS

For the purpose of illustrating the invention, there is shown in the drawings a form that is presently preferred; it is being understood, however, that this invention is not limited to the precise arrangements and instrumentalities.

DETAILED DESCRIPTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims. Hereinafter, the present invention will be described in detail by explaining exemplary embodiments of the invention with reference to the attached drawings.

Although the invention is not limited to it, the following description refers to a method for representing annotation points on a hand displayed on 2D images. The 2D images are acquired by using a monochrome 2D camera. Advantageously, the monochrome 2D camera is a camera used in a virtual reality headset or in an augmented reality portable device or to any portable computing device which comprises software and hardware components suitable to implement virtual reality and/or augmented reality.

One object of the invention is to build several thousands of 2D images of hands annotated in order to feed a machine learning model as training data. Said engine being intended to be integrated in the virtual reality and/or augmented reality device.

Figure 1:
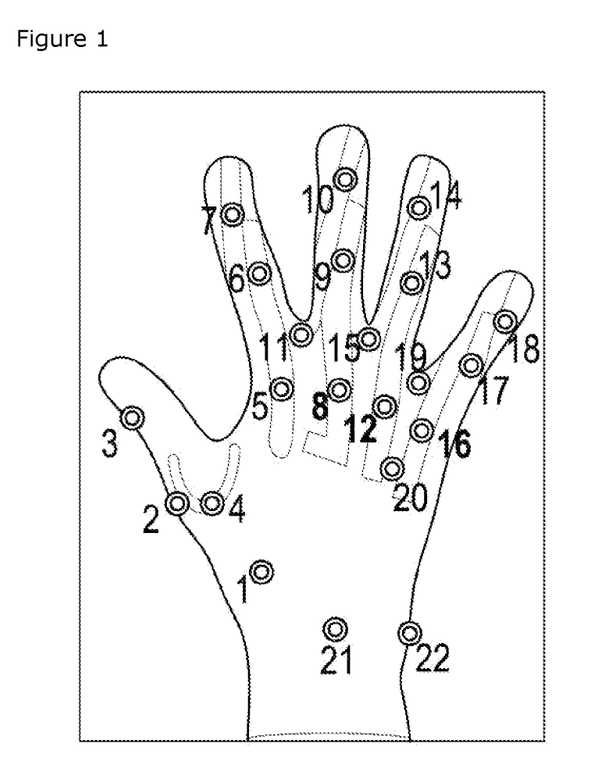
FIG. 1 is a general view of a hand wherein 22 annotation points are represented.

On FIG. 1 is illustrated a hand wherein 22 annotation points are placed on joints and other strategic areas of the hand. More or less annotation points can be used in the same or different places on the hand. Each finger comprises several points. Some points are arranged out of the fingers, in areas allowing an effective identification of the whole hand. The aim of the present invention is to quickly create several 2D images of hands in different environments (exposure, color . . . ).

Figure 2:
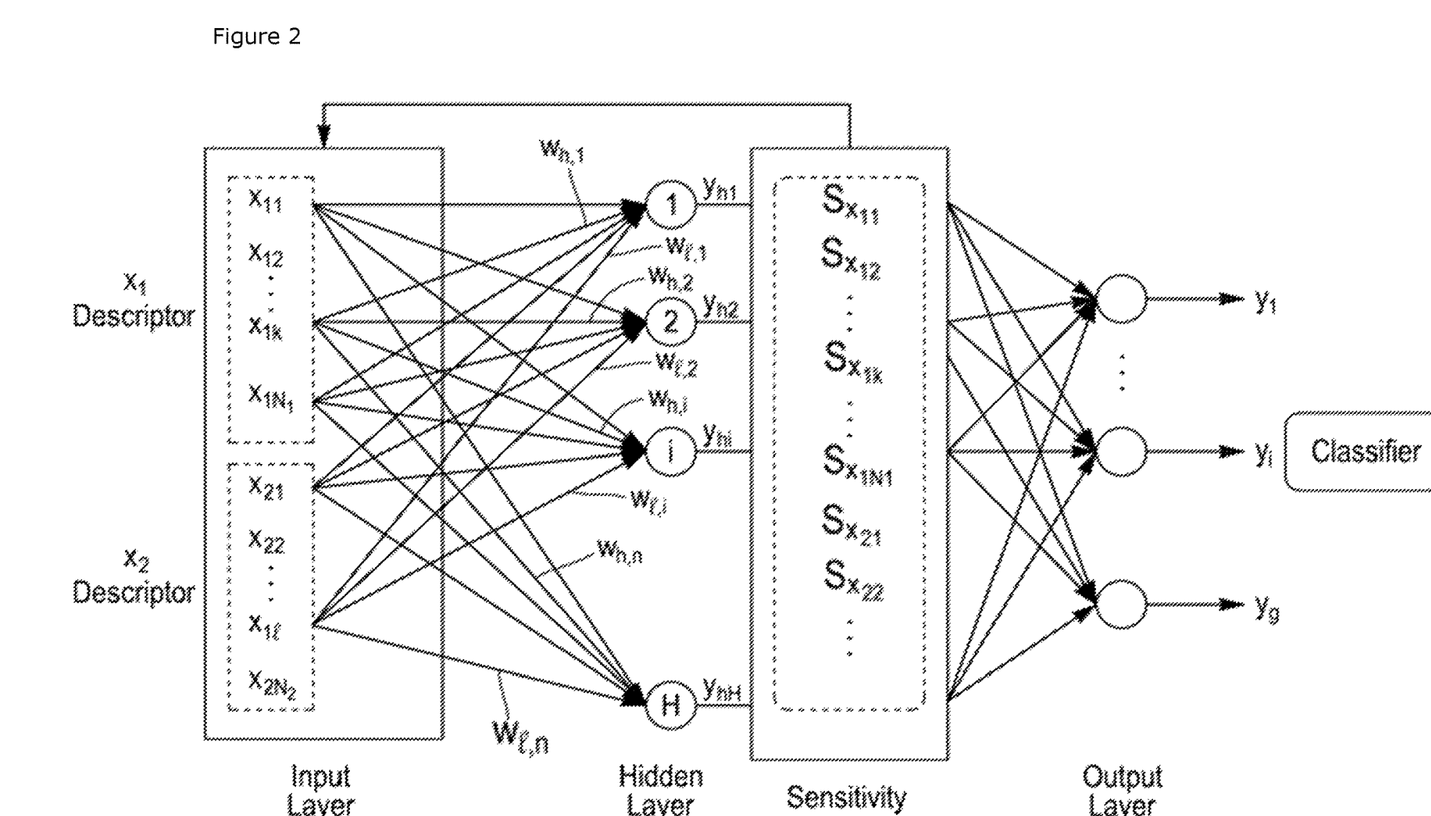
FIG. 2 is a general view of a neural network.

FIG. 2 shows a neural network that can be used as machine learning model to predict a hand. This neural network comprises an input layer fed by two descriptors with training dataset. A hidden layer is composed of nodes to propagate decisions towards an output layer. There is a sensitivity layer allowing a measure of the quality of the model according to the proportion of false positives, false negatives, true positives, etc. For example, a true positive can be a hand pixel identified as a hand element and a false negative can be a background pixel labeled as a hand pixel. The higher the sensitivity value, the greater the amount of true positives and the fewer false negatives. Low sensitivity means there are fewer true positives and more false negatives.

Figure 3:
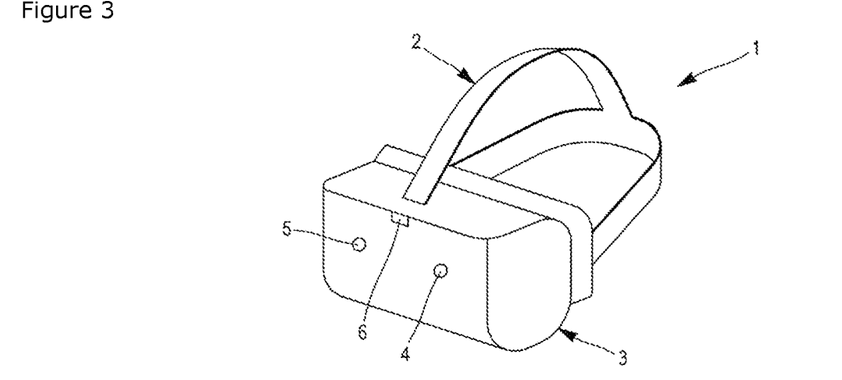
FIG. 3 is a general view of a virtual reality headset comprising 2D camera and engine according to the invention.

This machine learning model can be used in a virtual reality (VR) headset 1 as illustrated on FIG. 3. The headset is equipped with software and hardware to implement a motion tracking. The headset is intended to be worn by a user all around the eyes. The user can look around a virtual space as if he is actually there. The VR headset can provide an accurate position tracking as it uses a six-degrees-of-freedom (6DoF) motion position. It can accurately follow the direction and the position of the user: moving forward, backward, up, down, left, or right. The band 2 is used to maintain the headset on the head. The front rigid body 3 includes electronic components. Preferably, all components are integrated in the front rigid body 3 in order to optimize compactness, reliability and processing speed.

A first and second monochrome cameras 4, 5 are visible from the front side of the headset. Those cameras 4 and 5 are used to capture the environment around the user. An illuminator 6 is provided arranged on the forehead of the headset 1, for example at equal distances from the two cameras 4 and 5. The cameras 4 and 5, for example Infrared cameras, are each a 2D camera according to the invention. According to the invention said cameras have to be used to acquire 2D images based on the method according to the invention. Then, the machine learning model will be designed using training data obtained thanks to said 2D cameras.

Figure 4:
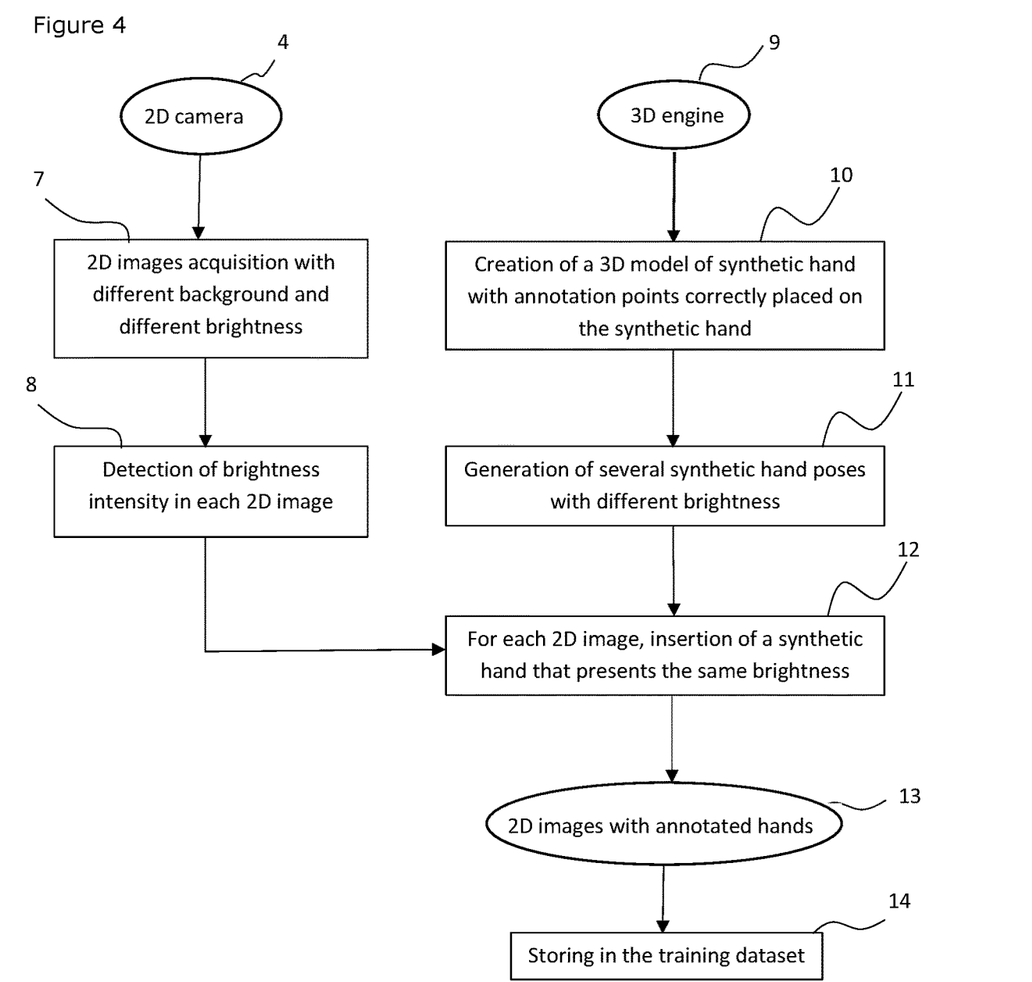
FIG. 4 is a flowchart illustrating a method according to the invention for creating annotated hands on 2D images acquired by a 2D camera according to the invention.

A method according to the present invention will now be described based on FIGS. 4-10. FIG. 4 shows a flowchart starting with step 7 of images acquisition with different background and different brightness by means of 2D camera 4. In general, 2D camera are considered as a camera with poor resolution. Advantageously, such a camera costs less than high resolution 3D cameras or depth of field cameras for example. One of the advantage of the present invention is to obtain 2D images of hands with a high resolution in the placement of annotation points. The acquisition can be done by recording a video in different places, outside as well as inside buildings to have different brightness conditions. The video can then be considered image per image. A 3D engine 9 is preferably used to process the 2D images. On step 10, the 3D engine is used to create a 3D model of synthetic hands with annotation points correctly placed on different areas of the synthetic hand.

Figure 5:
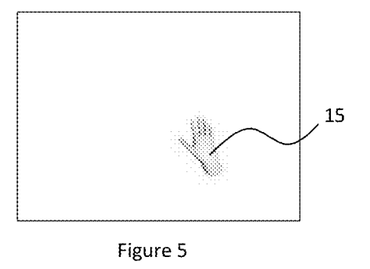
FIG. 5 is a general view of a synthetic hand.

FIG. 5 shows such a 3D model of synthetic hand. The synthetic hand 15 on FIG. 5 can be moved in different poses and for different brightness. Although the annotation points are not displayed on FIG. 5, these points are predefined on the hand and recorded as parameters. They can be displayed or not.

The hand 15 can be configured to present different sizes, skin colors, different textures, and objects such as clock or other can be put on it. The 3D engine is for example designed to be usable with a computer mouse or other input device. The step 11 concerns a generation of several synthetic hand poses with different brightness. To do so, for each pose of the hand, several images of the hand are recorded with different intensity of brightness. Accordingly, at this step, for each recorded image or representation of the synthetic hand in a given pose, the intensity of brightness is known.

In parallel, at step 8, the 3D engine performs a detection of brightness intensity in each 2D image. The detection can consist in defining different areas on the image and in calculating the average intensity of brightness in each area. The detection can also consist in defining a global brightness intensity of the 2D image.

In the following assembly code is described a method of insertion where a rectangular frame is defined around a hand or an object having a given brightness. A brightness is determined as an average of Y components in a YUV color encoding system. A 2D image having an average brightness similar to the brightness of the hand is considered. The brightness is calculating in each rectangular frame of the 2D image. The hand is placed in a rectangular frame having precisely the same brightness as the hand brightness.

```
Step 1 - defining a frame around the hand or an object
void crop(const int *src, int srcWidth, int srcHeight, int *dst, int dstWidth,
int dstHeight, int x, int y) {
   src += x + y * srcWidth;
   if (srcWidth == dstWidth) {
      memcpy(dst, src, sizeof(int) * dstWidth * dstHeight);
      return;
   }
   for (int i = 0; i < dstHeight; i++) {
      memcpy(dst, src, sizeof(int) * dstWidth);
      src += srcWidth;
      dst += dstWidth;
   }
}
**Step 2 - determining the brightness in the 2D image **
std::pair<float, float> getBrightness(const Mat8888& input, const Rect
* cropRect = NULL) {
   static Mat8888 croppedYUV;
   static Mat8888 croppedRGBA;
   if(cropRect) {
      croppedRGBA.resize(cropRect->width, cropRect->height);
      crop(input.data( ),
         input.cols( ),
         input.rows( ),
         croppedRGBA.data( ),
         croppedRGBA.rows( ),
         croppedRGBA.cols( ),
         cropRect->x, cropRect->y);
   } else {
      croppedRGBA.resize(input.rows( ), input.cols( ));
      croppedRGBA.copyFrom(input);
   }
   croppedYUV.resize(croppedRGBA.rows( ), croppedRGBA.cols( ));
   ClayCVColorConverter::RGBToYUV(croppedRGBA, croppedYUV);
   static float values[640*480];
   int valuesSum = 0;
   int valuesCount = 0;
   int size = croppedYUV.size( );
   const int* yuvData = (const int*) croppedYUV.data( );
   const int* rgbaData = (const int*) croppedRGBA.data( );
   while (size--) {
      int a = A(*(rgbaData++));
      if(a > 0) {
         int y = R(*yuvData);
         values[valuesCount++] = y;
         valuesSum += y;
      }
      yuvData++;
   }
   float mean = valuesSum / (float) valuesCount;
   float sqSum = 0;
   for(int i = 0; i < valuesCount; i++) {
      sqSum = (values[i] - mean) * (values[i] - mean);
   }
   float stdev = std::sqrt(sqSum / (float) valuesCount);
   return {mean, stdev};
}
Step 3 - associating backgroung with the object
int match(const HandSample &handSample, const BackgroundRepository
&bg Repository, bool contrastMode) {
   std::pair<float,       float>       handBrightness     =
getBrightness(handSample.image);
   const int bgCount = bgRepository.count( );
   static std::vector<int> bgIndexes(bgCount);
   for(int i = 0; i < bgIndexes.size( ); i++) {
      bgIndexes[i] = i;
   }
   unsigned              seed              =
std::chrono::system_clock::now( ).time_since_epoch( ).count( );
   shuffle       (bgIndexes.begin( ),         bgIndexes.end( ),
std::default_random_engine(seed));
   float bestScore = contrastMode ? -FLT_MAX : FLT_MAX;
   int bestBgIndex = -1;
   for(int i = 0; i < bgRepository.count( ); i++) {
      int bgIndex= bgIndexes[i];
      const Mat8888& bg = bgRepository.getImage(bgIndex);
      std::pair<float,       float>       bgY      =      getBrightness(bg,
&handSample.handBounds);
      float score = std::max(fabsf(handBrightness.first - bgY.first),
fabsf(handBrightness.
      if(contrastMode && score > bestScore) {
         bestScore = score;
         bestBgIndex = bgIndex;
         float randMax = 120 + std::rand( ) / (float) RAND_MAX *
20;
         if(bestScore > randMax) break;
      }
      if(!contrastMode && score < bestScore) {
         bestScore = score;
         bestBgIndex = bgIndex;
         float randMin = std::rand( ) / (float) RAND_MAX * 5;
         if(bestScore < randMin) break;
      }
   }
   return bestBgIndex;
}
```

The steps 7-11 can be carried out in parallel or not, in real time or not.

On step 12, for each 2D image, insertion of a synthetic hand that presents the same brightness as the 2D image or a part of the 2D image. In other words, the 3D engine performs a comparison between the brightness intensity of the 2D image (or a part of the 2D image) and the brightness intensity of each synthetic hand. If there is a match, then the corresponding synthetic hand is inserted inside the 2D image at the area where the same brightness has been found. There is a match when the brightness intensities between the 2D image and the synthetic hand are identical or with a predetermined tolerance.

Figure 6:
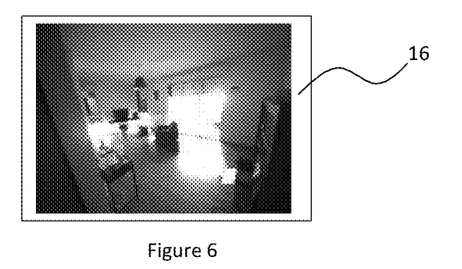
FIG. 6 illustrates a 2D image.

For example, to insert the hand or object into the image, the size of the hand is planned to be sized as if it were placed between 10 and 60 cm from the camera. At this stage, all or a part of 2D images for which a compatible (based on brightness intensity) synthetic hand has been found, have been converted into 2D images comprising annotated hand, as illustrated on 13. FIG. 5 illustrates a synthetic hand 15 according to the invention. FIG. 6 illustrates a 2D image 16 where the background presents a brightness intensity equivalent to that of the synthetic hand 15.

Figure 7:
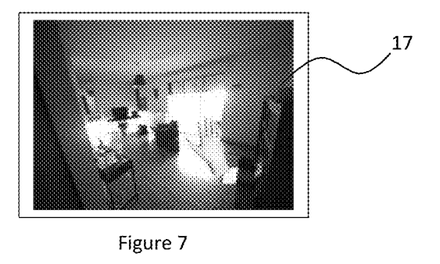
FIG. 7 illustrates a combination of elements of FIGS. 5 and 6.
Figure 8:
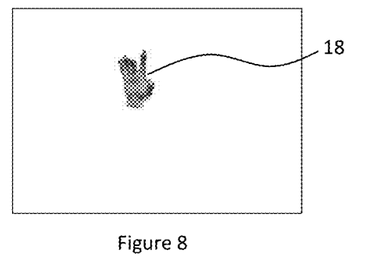
FIG. 8 is a general view of a synthetic hand in a different pose relative to the synthetic hand of FIG. 5.
Figure 9:
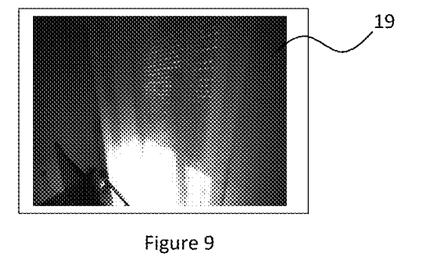
FIG. 9 illustrates another 2D image.
Figure 10:
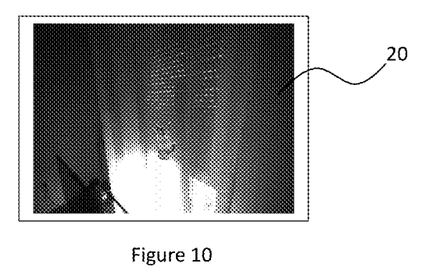
FIG. 10 illustrates a combination of elements of FIGS. 8 and 9.

FIG. 7 illustrates an image 17 resulting from the combination of the synthetic hand 15 with the 2D image 16. FIG. 8 illustrates a synthetic hand 18 according to the invention with a different pose and different brightness conditions relative to the hand 15. FIG. 9 illustrates a 2D image 19 where the background presents a brightness intensity equivalent to that of the synthetic hand 18. FIG. 10 illustrates an image 20 resulting from the combination of the synthetic hand 18 with the 2D image 19. On step 14 the 2D images with annotated hand 13 are stored in the training dataset.

The method according to the invention has several advantages. It can be adapted to all available cameras. The 2D camera is used to make a video in different environment, or 2D images of the corresponding 2D camera can already be available. The annotation phase is much faster and more precise than the manual annotation of each key point. Since it does not depend on an iteration algorithm or an ML model, it can take place in real time. The estimated time for annotating 100 thousand images is 30 minutes. With the method according to the invention, training data comprising hands annotated on 2D images are obtained. The data will be used for the training of a machine learning model that will be used in a device; this device also being provided with a 2D camera used for the acquisition of 2D images during the method of the invention. The method provides the invention with a high level of precision and a lot of data in few minutes.

Numerous variations and modifications will become apparent to those skilled in the art once the above disclosure is fully appreciated. It is intended that the following claims be interpreted to embrace all such variations and modifications.

The invention claimed is:

1. A method for generating 2D images, the method being carried out by a processing unit and comprising the steps of:
    generating a synthetic 3D model of an object with annotation points;
    based on the synthetic 3D model of the object, generating a plurality of synthetic objects with different poses and different brightness conditions;
    receiving a plurality of 2D images with different backgrounds and different brightness conditions;
    calculating a brightness value for each of the plurality of 2D images; and
    for each of the plurality of 2D images, inserting one of the plurality of synthetic objects based on the corresponding brightness value.

2. The method according to claim 1, wherein inserting the one of the plurality of synthetic objects comprises randomly inserting the one of the plurality of synthetic objects.

3. The method according to claim 1, wherein inserting the one of the plurality of synthetic objects comprises, for each of the plurality of 2D images, inserting the one of the plurality of synthetic objects that presents the same brightness conditions as a corresponding one of the plurality of 2D images.

4. The method according to claim 3, wherein the brightness conditions comprise an intensity of a background of the corresponding one of the plurality of 2D images.

5. The method according to claim 3, wherein inserting the one of the plurality of synthetic objects comprises:
    generating the plurality of 2D images from video acquired using a 2D camera;
    modeling an environment in which the 2D camera operates to acquire the plurality of 2D images with the brightness conditions; and
    associating a synthetic object of the plurality of synthetic objects each one of the plurality of 2D images having same brightness conditions.

6. The method according to claim 1, wherein inserting the one of the plurality of synthetic objects comprises:
    based on the brightness values, associating a 2D image of the plurality of 2D images with a hand image having a same brightness value;
    defining a frame around the one of the plurality of synthetic objects;
    calculating a brightness value of the 2D image within an area defined by the predefined frame, and determining the calculated brightness is the same as a brightness of the one of the plurality of synthetic objects; and
    inserting the one of the plurality of synthetic objects in the 2D image at a location of the area having a same brightness as the hand image.

7. The method according to claim 1, wherein the plurality of 2D images come from a same 2D camera.

8. The method according to claim 7, wherein the 2D camera is a monochrome or an infrared camera.

9. The method according to claim 1, wherein generating the plurality of synthetic objects comprises generating the plurality of synthetic objects with different physical parameters.

10. The method according to claim 9, wherein the physical parameters comprise at least one of: a size of a synthetic object, a color of the synthetic object, and accessories arranged on the synthetic object.

11. The method according to claim 1, wherein the object is a hand.

12. An apparatus, comprising:
    a memory storing instructions; and
    at least one processor communicatively coupled to the memory, the at least one processor configured to execute the instructions to:
    generate a synthetic 3D model of an object with annotation points;
    based on the synthetic 3D model of the object, generate a plurality of synthetic objects with different poses and different brightness conditions;
    receiving a plurality 2D images with different backgrounds and different brightness conditions;
    calculate a brightness value for each of the plurality of 2D images; and
    for each of the plurality of 2D images, insert one of the plurality of synthetic objects based on the corresponding brightness value.

13. The apparatus of claim 12, wherein the at least one processor is configured to execute the instructions to randomly insert the one of the plurality of synthetic objects.

14. The apparatus of claim 12, wherein the at least one processor is configured to execute the instructions to, for each of the plurality of 2D images, insert the one of the plurality of synthetic objects that presents the same brightness conditions as a corresponding one of the plurality of 2D images.

15. The apparatus of claim 14, wherein to insert the one of the plurality of synthetic objects, the at least one processor is configured to execute the instructions to:
    generate the plurality of 2D images from video acquired using a 2D camera;

model an environment in which the 2D camera operates to acquire the plurality of 2D images with the brightness conditions; and associate a synthetic object of the plurality of synthetic objects with one of the plurality of 2D images having same brightness conditions.

16. The apparatus of claim 12, wherein to insert the one of the plurality of synthetic objects, the at least one processor is configured to execute the instructions to:

based on the brightness values, associate a 2D image of the plurality of 2D images with a hand image having a same brightness value;

define a frame around the one of the plurality of synthetic objects;

calculate a brightness value of the 2D image within an area defined by the predefined frame, and determining the calculated brightness is the same as a brightness of the one of the plurality of synthetic objects; and insert the one of the plurality of synthetic objects in the 2D image at a location of the area having a same brightness as the hand image.

17. The apparatus of claim 12, wherein the plurality of 2D images come from a same 2D camera.

18. The apparatus of claim 12, wherein the at least one processor is configured to execute the instructions to generate the plurality of synthetic objects with different physical parameters.

19. The apparatus of claim 12, wherein the object is a hand.

20. An apparatus comprising:

a memory; and at least one processor communicatively coupled to the memory, the at least one processor configured to:

receive an image; and detect an object within the image using a neural network, wherein the neural network is trained based on training data comprising a plurality of 2D images with inserted synthetic objects, wherein the plurality of 2D images with inserted synthetic objects are generated based on a brightness value calculated for each of the plurality of 2D images, wherein, for each of the plurality of 2D images, one of the plurality of synthetic objects are inserted based on the corresponding brightness value.

* * * * *